United States Patent [19]

Satoh et al.

[11] Patent Number: 4,507,266
[45] Date of Patent: Mar. 26, 1985

[54] GLOW DISCHARGE GENERATING APPARATUS

[75] Inventors: Saburoh Satoh, Kawasaki; Tatumi Gotoh, Yamato; Kenji Horii, Aichi; Hidenori Akiyama, Nagoya, all of Japan

[73] Assignee: Tokyo Shibaura Denki Kabushiki Kaisha, Kawasaki, Japan

[21] Appl. No.: 473,635

[22] Filed: Mar. 9, 1983

[30] Foreign Application Priority Data

Mar. 10, 1982 [JP] Japan ................. 57-37753

[51] Int. Cl.$^3$ ............................. C01B 13/11
[52] U.S. Cl. ................... 422/186.15; 204/176; 331/126; 422/907
[58] Field of Search ............ 422/186.04, 186.07, 422/186.15, 186.16, 186.21, 186.30, 907; 204/176; 331/126, 127

[56] References Cited

U.S. PATENT DOCUMENTS

| 3,444,061 | 5/1969 | Hellund | 422/186.04 |
| 3,484,363 | 12/1969 | Williams | 422/186.21 |
| 3,702,973 | 11/1972 | Daugherty et al. | 422/186.07 |
| 3,842,366 | 10/1974 | Gordon et al. | |
| 4,051,043 | 9/1977 | Harter et al. | 422/186.04 |
| 4,077,017 | 2/1978 | Gilson et al. | |
| 4,150,343 | 4/1979 | Sellig et al. | |
| 4,152,603 | 5/1979 | Imris | 422/186.16 |
| 4,287,483 | 9/1981 | Rudko et al. | |
| 4,339,656 | 7/1982 | Komura et al. | 422/186.18 |
| 4,341,947 | 7/1982 | Komura et al. | 422/186.18 |

OTHER PUBLICATIONS

Discharge Energy Loading Characteristics of a UV-Preionized Tea CO$_2$ Laser, Suzuki et al., U.S. Journal, Review Scient., Instrum., vol. 53, No. 2, Feb. 1982, pp. 184 to 186.

Xenon-Helium Laser at High Pressure and High Repetition Rate, Russell Targ and Michael W. Sasnett; U.S. Journal Appl. Phys. Letters, vol. 19, 1971, pp. 537-539.

*Primary Examiner*—Ben R. Padgett
*Assistant Examiner*—Howard J. Locker
*Attorney, Agent, or Firm*—Cushman, Darby & Cushman

[57] ABSTRACT

A glow discharge generating apparatus comprises, in a glow discharge chamber, an anode, a cathode for generating a glow discharge between the cathode and the anode upon application of a negative pulse, and a triggering electrode for starting the glow discharge. To stabilize the glow discharge, the electron density distribution in the vicinity of the surface of the cathode is made uniform only during at least part of a continuous period of the glow discharge.

3 Claims, 10 Drawing Figures

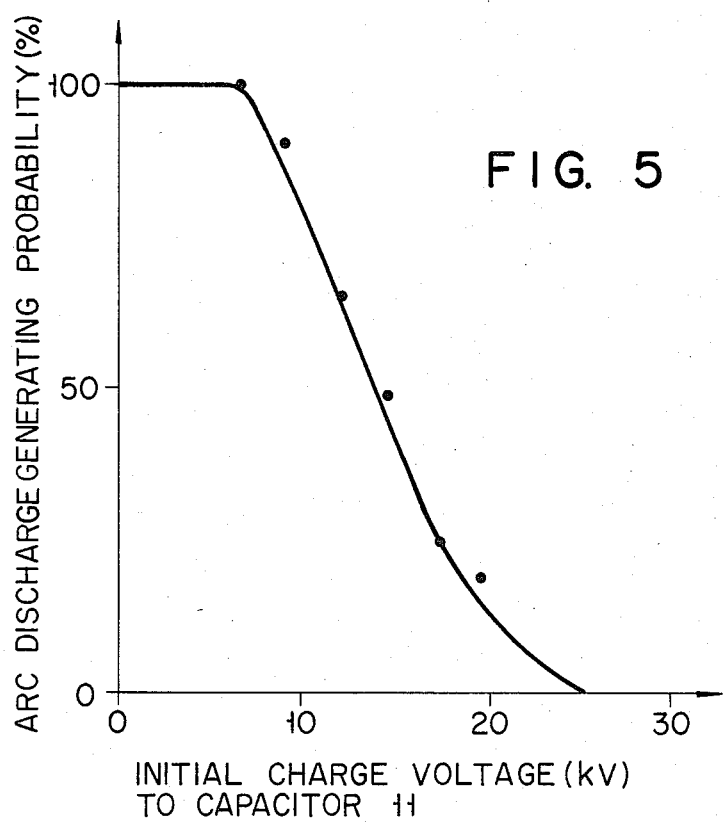

GLOW DISCHARGE GENERATING APPARATUS

BACKGROUND OF THE INVENTION

The present invention relates to a glow discharge generating apparatus which is capable of generating a glow discharge between an anode and a cathode by applying a pulse voltage between the anode and the cathode and, more particularly, to a glow discharge generating apparatus having stabilizing means for stabilizing the glow discharge by suppressing a glow to arc transition.

A glow discharge is utilized, for example, in a gas laser oscillator or an ozone generator. In a glow discharge, electrons generated by the ionization of gas are locally concentrated when a discharge becomes thermally unstable in one region, or when a great deal of negative ions of carbon monoxide $CO^-$, oxygen $\overline{O}$ or oxygen gas $\overline{O}_2$ are generated, or when a space charge distribution is caused to be uneven by the existence of projections on the surface of the anode, for example. It is understood that such a local concentration of electrons causes a glow discharge current to be locally concentrated at the cathode, resulting in a glow to arc transition. When this glow to arc transition occurs, the output of the gas laser oscillator, for example, decreases considerably, or the amount of generated ozone decreases in the ozone generator.

In order to prevent the above-described glow to arc transition, a predetermined gas has been passed between the anode and cathode at a high speed, or ballast resistors have been respectively inserted into needle cathode electrodes in a conventional gas laser oscillator. Since the gas laser oscillator of this gas flowing type, however, requires a circulator for circulating the gas, it was difficult to reduce the size of the laser oscillator, and it was impossible to increase the oscillation efficiency of the laser oscillator provided with the above ballast resistors, due to the loss of energy of the ballast resistors. In order to prevent a glow to arc transition in the conventional ozone generator, a silent discharge system has been adopted to suppress the concentration of a discharge current in a discharge space by inserting a dielectric member between the anode and cathode. Since this silent discharge system, however, has a limit in the dielectric strength of the member, a voltage value to be applied between the anode and cathode is limited. Therefore, the distance between the anode and cathode cannot be increased, and thus, the amount of ozone generated in the space between the anode and cathode cannot be increased.

SUMMARY OF THE INVENTION

It is an object of the present invention to provide a glow discharge generating apparatus including stabilizing means for stabilizing a glow discharge generated between an anode and a cathode arranged opposite to each other in a glow discharge chamber in a manner such that the electron density distribution in the vicinity of the surface of the cathode is made uniform only during at least part of a continuous period of the glow discharge.

In order to achieve the above object, there is provided a glow discharge generating apparatus comprising an anode and a cathode disposed opposite to each other in a glow discharge chamber; a main voltage source connected between the anode and the cathode for applying a pulse voltage of a predetermined waveform to generate the glow discharge between the anode and the cathode; triggering means for starting the glow discharge; and stabilizing means for stabilizing the glow discharge by making the electron density distribution uniform in the vicinity of the surface of the cathode only during at least part of a continuous period of the glow discharge.

BRIEF DESCRIPTION OF THE DRAWINGS

FIG. 5 is a view showing one example of a characteristic diagram illustrating the relationship between the charging voltage value of a capacitor in an auxiliary discharge circuit in FIG. 1 and an arc discharge generating probability.

DETAILED DESCRIPTION OF THE PREFERRED EMBODIMENTS

The present invention will now be described in more detail with reference to the accompanying drawings.

Figure 1:
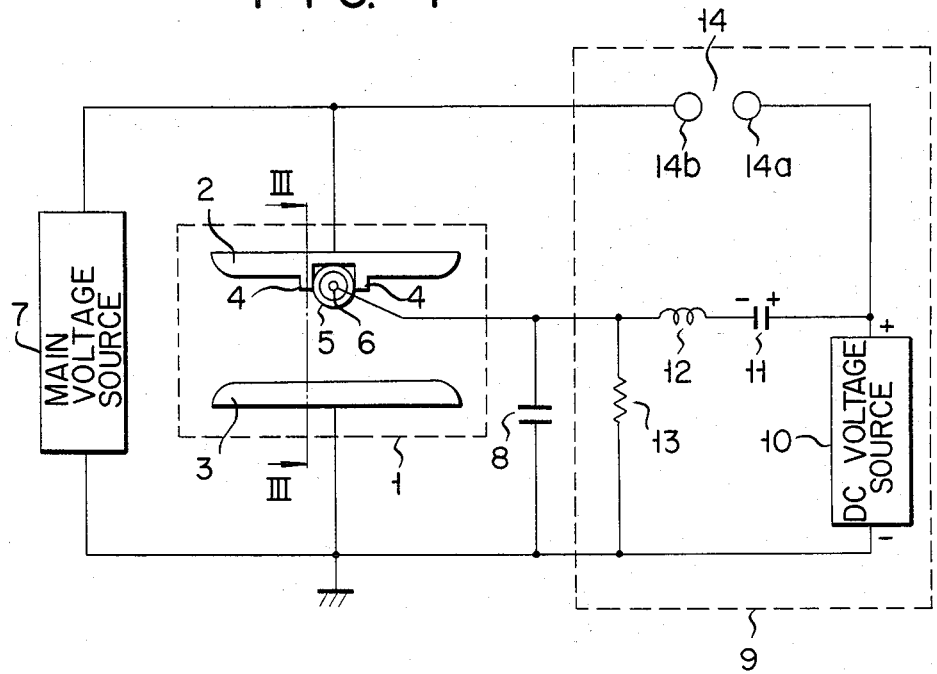
FIG. 1 is a circuit diagram of an embodiment of a glow discharge generating apparatus according to the present invention.
Figure 2:
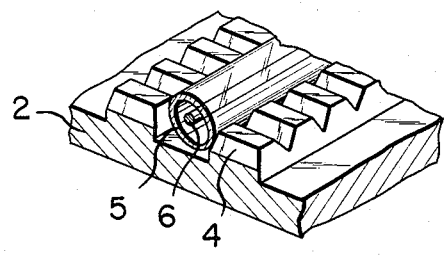
FIG. 2 is a perspective view showing an example of the surface shape of the cathode confronting the anode in FIG. 1.
Figure 4A:
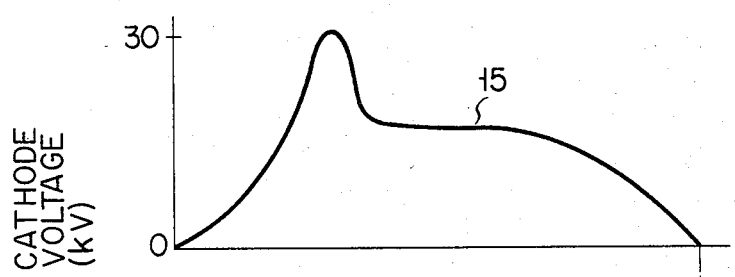
FIGS. 4A to 4D are timing charts of the voltage and current waveforms at predetermined portions of the apparatus shown in FIG. 1.
Figure 4B:
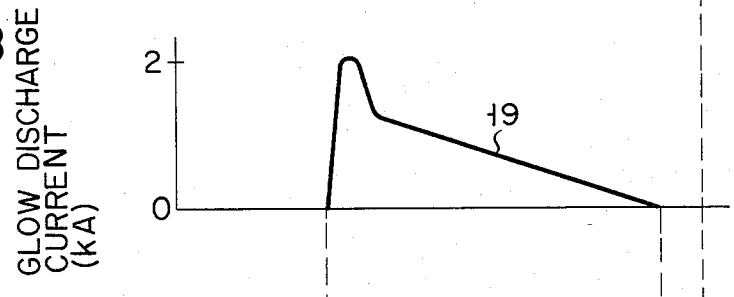

In FIG. 1, a cathode 2 and an anode 3 are disposed opposite to each other in a glow discharge chamber 1, which contains a predetermined gas. An example of the surface shape of the cathode 2 confronting the anode 3 is shown in FIG. 2, and the surface of the anode 3 confronting the cathode 2 is substantially planar. In FIG. 2, a plurality of trapezoidal projected portions 4 are formed on the surface of the cathode 2 confronting the anode 3. A triggering electrode 6 which passes through the center of a glass tube 5 is provided between adjacent projected portion rows (only one of which is shown in FIG. 2), and the electrodes 6 are electrically connected to each other. Only two rows of the projected portions 4 provided on the cathode 2 and one triggering electrode 6 are shown in FIG. 1 for the simplicity of illustration. A main voltage source 7 which generates a pulse voltage of a predetermined waveform repeated at high speed such as, for example, a pulse voltage 15 of the waveform shown in FIG. 4A, is connected between the cathode 2 and the anode 3, and the anode 3 is grounded. A first capacitor 8 is connected between the anode 3 and the triggering electrode 6. An auxiliary discharge circuit 9 is coupled to the cathode 2, the triggering electrode 6 and the anode 3. This circuit 9 has an auxiliary voltage source, e.g., a DC voltage source 10, a series circuit which includes a second capacitor 11 connected at one terminal to the positive terminal of the voltage source 10 and at the other terminal to the triggering electrode 6 through an inductance coil 12, a resistor 13 which is connected at one end to the triggering electrode 6 and at the other end to the negative terminal of the voltage source 10 and the anode 3, and a gap switch 14 connected between the positive terminal of the voltage source 10 and the cathode 2.

Figure 3A:
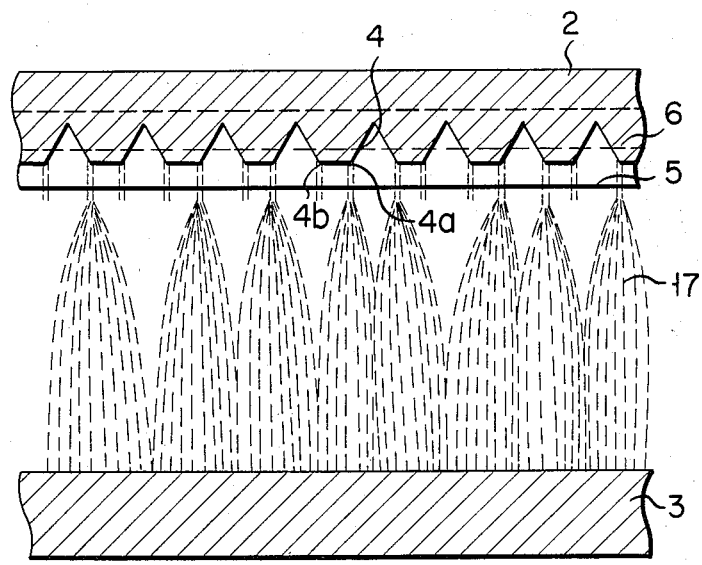
FIGS. 3A and 3B are enlarged views showing part of the cross section along the line III—III in FIG. 1 in relation to a glow discharge.
Figure 3B:
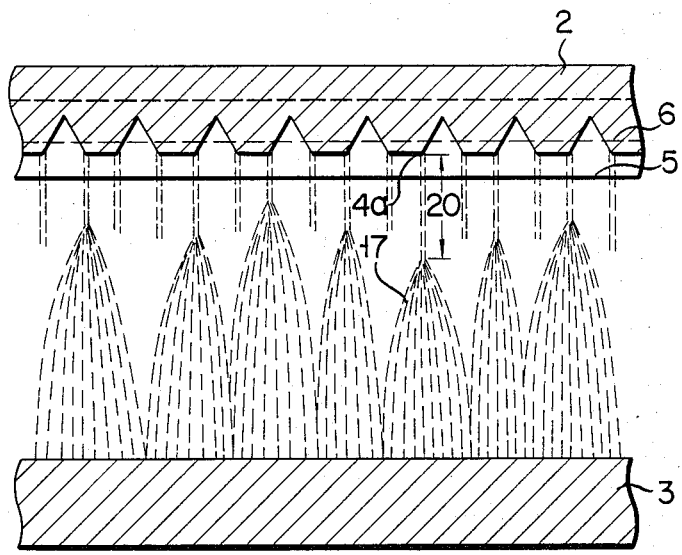
Figure 4C:
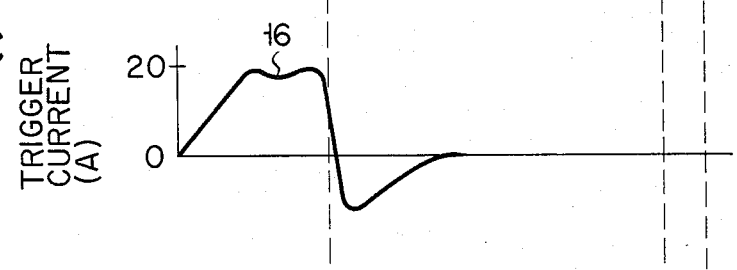
Figure 4D:
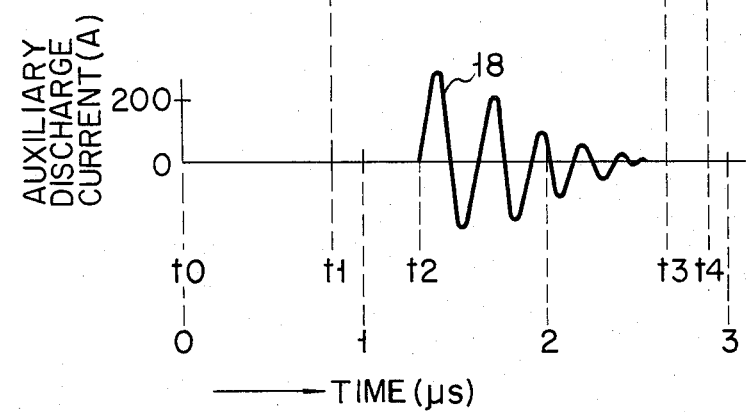

The operation of the apparatus shown in FIG. 1 will now be described with reference to FIGS. 4A to 4D, and 3A and 3B. It is assumed that the second capacitor 11 is charged in polarity, as shown, by the voltage source 10 through the resistor 13 and the inductance coil 12 in the circuit 9. The voltage source 7 is constructed to generate, for example, a negative pulse voltage 15 having a smooth rising characteristic, as shown in FIG. 4A, in a predetermined repeating frequency. This pulse 15 is applied between the cathode 2 and the anode 3, and is simultaneously applied between the triggering electrode 6 and the cathode 2 through the first capacitor 8. Accordingly, a high electric field is generated between the triggering electrode 6 and the cathode 2, with the result that a corona current, i.e., a triggering current 16 as shown in FIG. 4C will flow between the triggering electrode 6 and the cathode 2. Thus, a great deal of electrons and ions are supplied to the surface of the cathode 2. An electron avalanche is generated in the gap between the cathode 2 and the anode 3 with the electrons as initial electrons. Consequently, a glow discharge current 19 (FIG. 4B) starts to flow between the cathode 2 and the anode 3. Since the negative voltage of the voltage source 7 is applied through the resistor 13, inductance coil 12 and the capacitor 11 to one terminal 14a of the gap switch 14 and the negative voltage from the voltage source 10 is applied to the other terminal 14b, when the difference between the amplitude of the voltage 15 and the voltage of the source 10 becomes a predetermined value, an arc discharge is generated between the terminals 14a and 14b of the switch 14, and the switch 14 is substantially short-circuited in this manner. As a result, the charge stored in the capacitor 11 is discharged through a loop which includes the switch 14, the cathode 2, the triggering electrode 6 and the inductance coil 12 in an oscillatory mode. In other words, an auxiliary discharge current, i.e., the corona current 18 as shown in FIG. 4D, will flow between the cathode 2 and the triggering electrode 6. This discharge current 18 has, as shown in FIG. 4D, a damped oscillatory waveform. With this auxiliary discharge current, the electron density distribution in the vicinity of the surface of the cathode is maintained uniform, at least for part of the continuous period of the glow discharge current 19. Therefore, a glow to arc transition caused by the local concentration of glow discharge at the cathode 2 is suppressed. As shown in FIG. 3A, the glow discharge is generated between edge portions 4a, 4b of the projected portions 4 on the surface of the cathode 2 and the anode 3. When the glow discharge is stable, it takes the form of a diffused discharge 17 as shown in FIG. 3A. When the glow discharge is unstable, the current is concentrated at a portion 20 between the edge portion 4a and the diffused discharge 17, as shown in FIG. 3B, and the state of the portion 20 is eventually extended between the edge portion 4a and the anode 3 so that the glow to arc transition occurs. FIG. 3A shows an example of the state of glow discharge generated between the cathode 2 and the anode 3 in the apparatus shown in FIG. 1, and FIG. 3B shows an example of the state of glow discharge when the auxiliary discharge circuit 9 in FIG. 1 is omitted. In FIG. 3B, part of the discharge current is clearly concentrated in the portion 20, illustrating that a glow to arc transition readily occurs.

The operation will be further described with reference to the timing charts in FIGS. 4A to 4D. It is assumed that the pulse voltage 15 is applied during the period from time $t_0$ to time $t_4$. It is shown that a glow discharge is generated during the period from time $t_1$ to time $t_3$ and a discharge current 19 flows during this period. That the auxiliary discharge current 18 is caused to flow between the cathode 2 and the electrode 6 during the period from time $t_2$ to $t_3$ is also illustrated. This is because there is a high probability that the glow discharge will change to an arc discharge during the period from time $t_2$ to time $t_3$. The auxiliary discharge current 18 may also flow during the priod from time $t_1$ to time $t_3$. When the voltage for the auxiliary discharge is always applied between the cathode 2 and the triggering electrode 6, there is another drawback in that power consumption will increase. In a laser oscillator, the temperatures of the electrode and the gas are raised by this power consumption, a mixture gas in the glow discharge chamber 1 is thermally dissociated (carbon dioxide $CO_2$ is, for example, dissociated to carbon monoxide CO and oxygen gas $O_2$), and the oscillation output of the laser oscillator is decreased. The glass tube 5 is thermally deteriorated, and the lifetime of the apparatus is reduced. Thus, a cooler for radiating the heat causing the above-described drawbacks becomes necessary. However, according to the embodiment shown in FIG. 1, the discharge current 18 only flows during at least part of the continuous period of the glow discharge. Accordingly, the aforementioned drawbacks can be avoided. The auxiliary discharge current described above is not limited to the damped oscillatory current. For example, the auxiliary discharge current may be a nondamped oscillatory current having a predetermined frequency. The switch 14 may be a switch which is driven directly by the cathode voltage. Since the apparatus of the present invention employing the auxiliary discharge circuit commonly uses the triggering electrode 6 as an electrode for starting a glow discharge and for flowing the auxiliary discharge current, the structure of the apparatus can be simplified.

An example of measurement of an arc discharge generation rate to the charging voltage of the second capacitor 11 in the apparatus shown in FIG. 1 is illustrated in FIG. 5. This measurement was conducted under conditions where the ratio of ingredients of the gas in the glow discharge chamber 1 was $N_2:CO_2:He:O_2 = 1:1:10:0.4$; the gas pressure approx. 1 atm; the peak value of the output pulse of the main voltage source 7 approx. 20 kV; and the repetition frequency of the output pulse of the main voltage source 7, and hence, the repetition frequency of the glow discharge 0.5 pps. As evident from FIG. 5, when the auxiliary discharge circuit 9 is not provided, the probability of an arc discharge occurring is 100%, but the arc discharge generating probability can be reduced by flowing the auxiliary discharge current. Particularly, when the charged voltage of the second capacitor 11 was set higher than 25 kV, the generation of the arc discharge could be completely suppressed. The energy required for setting the generation of the arc discharge substantially to zero was approx. 10% of the energy for generating the glow discharge.

Figure 6:
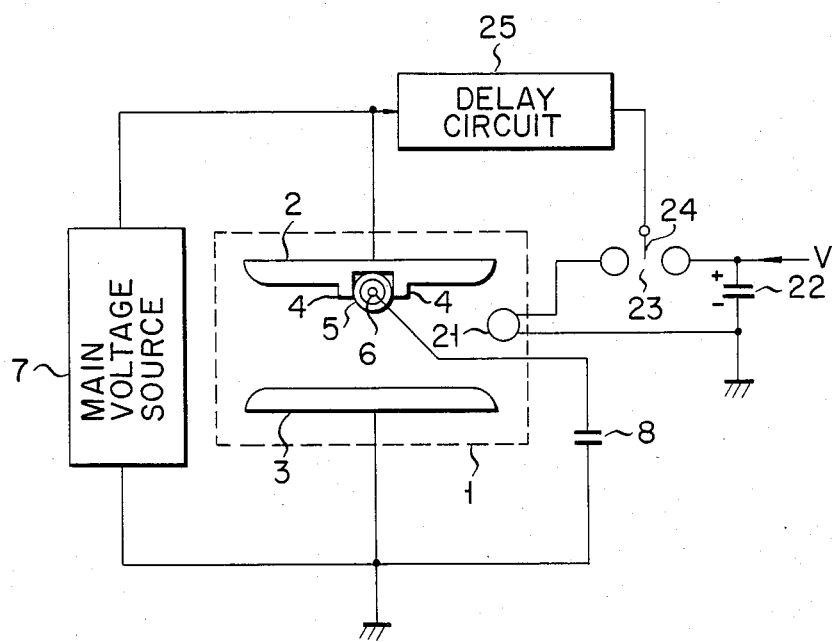
FIG. 6 is a circuit diagram of another embodiment of the apparatus of the present invention.

In another embodiment of the present invention shown in FIG. 6, an ultraviolet ray lamp 21 is provided in the glow discharge chamber 1. The ultraviolet rays are irradiated on the surface of the cathode 2 confronting the anode 3 only during at least part of the period of generating the glow discharge, thereby making uniform the electron density distribution in the vicinity of the surface of the cathode 2. In other words, a DC voltage is applied to one terminal of a third capacitor 22, the other terminal of the capacitor is grounded, and the third capacitor 22 is charged to a predetermined voltage. The one terminal of the capacitor 22 is connected through a gap switch 23 to one terminal of the lamp 21, and the other terminal of the lamp 21 is connected to the other terminal of the third capacitor 22. An adjusting needle 24 for adjusting the discharge timing of the gap switch 23 is connected through a delay circuit 25 to the cathode 2. In this embodiment, when the delay time of the delay circuit 25 is set to a predetermined value, the ultraviolet rays can be irradiated on the surface of the cathode 2 only during at least part of the period of generating the glow discharge. It is obvious that the electron density distribution in the vicinity of the surface of the cathode can be made uniform during the radiation of the ultraviolet rays. Therefore, the same advantages can be obtained in this embodiment as in the apparatus in FIG. 1.

As still another embodiment of the present invention, the embodiment shown in FIG. 6 may be associated with the embodiment shown in FIG. 1. Since the coupling means between the embodiments in FIGS. 6 and 1 is obvious, the illustration will be omitted.

When the embodiments described above are applied to a laser oscillator, an oscillation of high efficiency and high power can be performed. When the above embodiments are applied to an ozone generator, the voltage value to be applied between the cathode and the anode is not limited. Therefore, an interval between the cathode and the anode can be increased, thereby increasing the amount of generated ozone.

What we claim is:

1. A glow discharge generating apparatus, comprising:
    a glow discharge chamber housing an anode and a cathode disposed opposite to each other;
    a main voltage source, connected at its negative terminal to said cathode and at its positive terminal to said anode, for supplying a pulse voltage of a predetermined waveform to generate a glow discharge between said anode and said cathode;
    triggering means, comprising a triggering electrode disposed adjacent to said cathode and a first capacitor connected between said triggering electrode and said anode, for starting said glow discharge; and
    circuit means for stabilizing said glow discharge, including:
        a DC voltage source connected at its negative terminal to said anode,
        a series circuit, including a second capacitor and an inductance coil, connected between a positive terminal of said DC voltage source and said triggering electrode, and
        a gap switch, connected between said positive terminal of said DC voltage source and said cathode through which said second capacitor discharges, wherein
        a damped oscillating current for a predetermined period of time within the period of time of said glow discharge is produced by a series loop constituted by said second capacitor, said gap switch, said cathode, said triggering electrode and said inductance coil.

2. A glow discharge generating apparatus according to claim 1, wherein:
    said cathode comprises a plurality of rows, each row having a plurality of projected portions on the surface of said cathode facing said anode; and
    said triggering means includes a plurality of said triggering electrodes, each triggering electrode being disposed between two adjacent rows of said cathode.

3. A glow discharge generating apparatus according to claim 1, wherein:
    said circuit means further includes a resistor connected between said triggering electrode and said anode.

* * * * *